United States Patent
Tomita

(10) Patent No.: US 11,320,286 B2
(45) Date of Patent: May 3, 2022

(54) ROTATION DETECTION DEVICE HAVING PLURAL MAGNETIC SENSORS THAT PRODUCE UNIFORM OUTPUTS

(71) Applicant: Hitachi Metals, Ltd., Tokyo (JP)

(72) Inventor: Kazuhiko Tomita, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/167,860

(22) Filed: Feb. 4, 2021

(65) Prior Publication Data

US 2021/0247209 A1    Aug. 12, 2021

(30) Foreign Application Priority Data

Feb. 7, 2020   (JP) .............................. JP2020-019853

(51) Int. Cl.
*G01D 5/16*      (2006.01)

(52) U.S. Cl.
CPC ..................... *G01D 5/16* (2013.01)

(58) Field of Classification Search
CPC ............... G01D 5/12; G01D 5/14–147; G01D 5/16–1655; G01D 11/24; G01D 11/245; G01P 3/42–4802; G01P 3/481; G01P 3/487; G01P 3/488; G01R 33/07–077
See application file for complete search history.

(56) References Cited

U.S. PATENT DOCUMENTS

| | | | | | |
|---|---|---|---|---|---|
| 6,064,197 | A | * | 5/2000 | Lochmann | G01B 7/30 324/207.14 |
| 2007/0035293 | A1 | * | 2/2007 | Fukuoka | G01D 5/147 324/207.21 |
| 2009/0140725 | A1 | * | 6/2009 | Ausserlechner | G01R 33/072 324/207.2 |
| 2013/0154626 | A1 | * | 6/2013 | Takasaki | G01D 11/245 324/207.25 |
| 2014/0176126 | A1 | * | 6/2014 | Friedrich | G01R 33/077 324/207.2 |
| 2015/0192432 | A1 | * | 7/2015 | Noguchi | G01R 33/09 324/207.2 |
| 2017/0153265 | A1 | | 6/2017 | Yamamoto et al. | |
| 2017/0168080 | A1 | * | 6/2017 | Yamamoto | G01P 3/481 |

FOREIGN PATENT DOCUMENTS

JP        2017-096828  A        6/2017

* cited by examiner

*Primary Examiner* — Huy Q Phan
*Assistant Examiner* — David B Frederiksen
(74) *Attorney, Agent, or Firm* — Roberts Calderon Safran & Cole P.C.

(57) ABSTRACT

A rotation detection device includes a sensor unit including plural magnetic sensors and a housing portion covering the magnetic sensors together. The magnetic sensors each include a plate-shaped detection portion including a magnetic detection element to detect a magnetic field from a detection target member and connection terminals extending out of the detection portion. The magnetic sensors are arranged such that the detection portions are aligned in a plate thickness direction thereof. The magnetic detection element is configured to detect a magnetic field in a direction perpendicular to the plate thickness direction. The sensor unit is positioned such that fore-end portions of the detection portions of the magnetic sensors face toward an axial end face of the detection target member, the fore-end portions being end portions located opposite to the side where the connection terminals extend out.

4 Claims, 6 Drawing Sheets

FIG. 3A
FIG. 3B
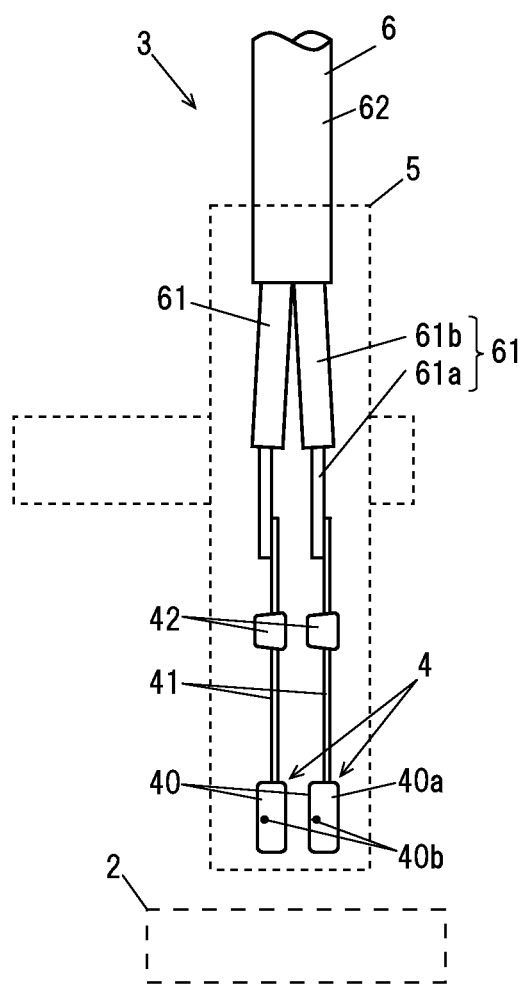
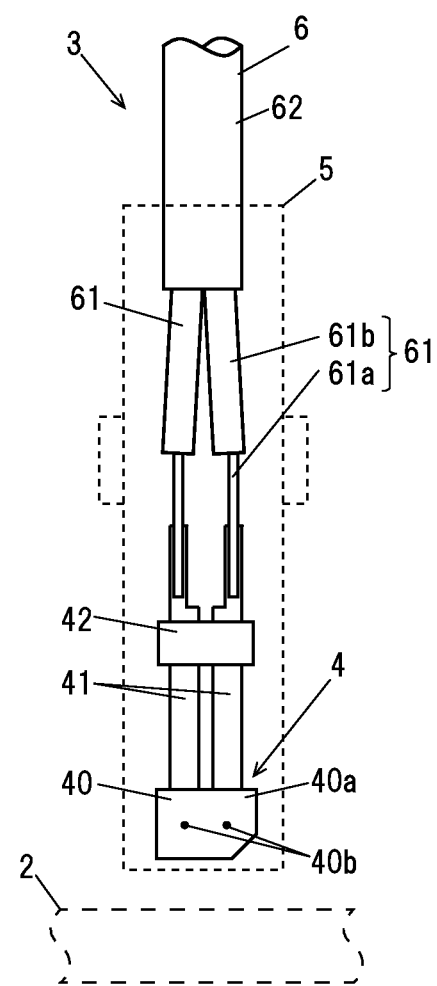

FIG. 4A
FIG. 4B
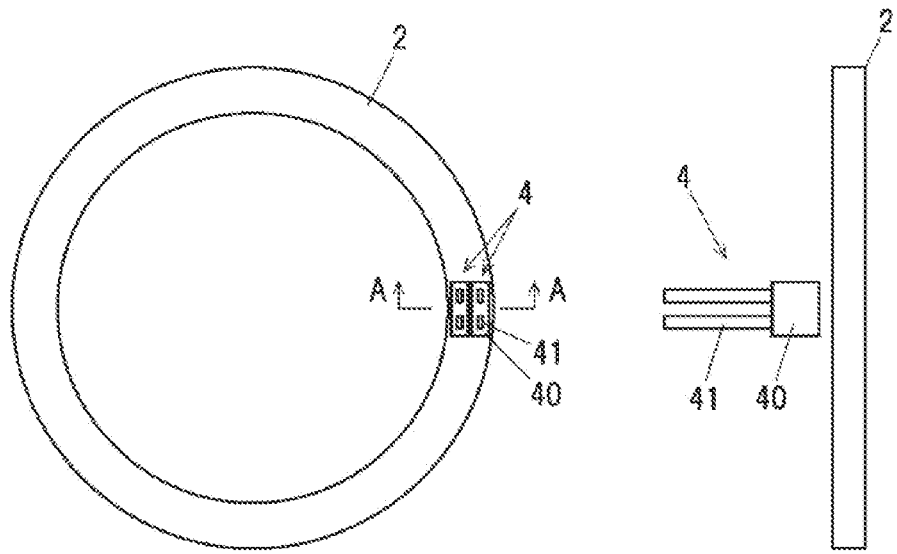
FIG. 5
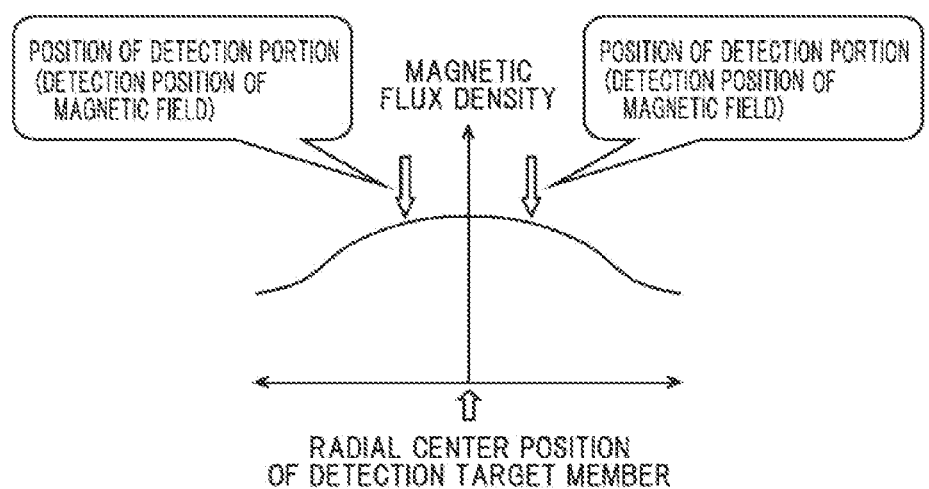

ROTATION DETECTION DEVICE HAVING PLURAL MAGNETIC SENSORS THAT PRODUCE UNIFORM OUTPUTS

CROSS-REFERENCE TO RELATED APPLICATIONS

The present patent application claims the priority of Japanese patent application No. 2020/019853 filed on Feb. 7, 2020, and the entire contents of Japanese patent application No. 2020/019853 are hereby incorporated by reference.

TECHNICAL FIELD

The present invention relates to a rotation detection device.

BACKGROUND ART

Rotation detection device used on, e.g., a wheel bearing unit to detect a rotational speed of a rotating member rotating with the wheel is conventionally known. The rotation detection device is configured that magnetic sensors provided in a sensor unit detect a change in a magnetic field caused by an annular magnet (hereinafter, referred to as "detection target member") attached to the rotating member and a rotational speed of the rotating member is thereby detected.

Patent Literature 1 discloses a rotation detection device in which plural magnetic sensors are provided inside the sensor unit for redundancy, Each magnetic sensor has a plate-shaped detection portion including magnetic detection elements to detect a magnetic field from the detection target member, and connection terminals extending out of the detection portion. In the configuration disclosed in Patent Literature 1, each connection terminal is bent into an L-shape so that one surface of the detection portion of each magnetic sensor faces toward a fore-end of the sensor unit, and the sensor unit is arranged so that the fore-end thereof faces an axial end face of the detection target member.

CITATION LIST

Patent Literature

Patent Literature 1: JP 2017/96828 A

SUMMARY OF INVENTION

Patent Literature 1 discloses a configuration in which the plural detection portions are aligned in a width direction of the detection portion (in a direction perpendicular to a length direction coinciding with an extending direction of the connection terminals and also perpendicular to a plate thickness direction). However, this configuration causes an increase in size of the sensor unit.

Patent Literature 1 also discloses a configuration in which the plural detection portions are stacked in the plate thickness direction. With this configuration, an increases in size of the sensor unit is avoided hut outputs of the respective magnetic sensors may be significantly different since each detection portion has a different distance from the detection target member. Considering functional safety defined in ISO 26262, it is desired that outputs from the magnetic sensors be as equal (uniform) as possible, i.e., it is desired to uniformize outputs of the plural magnetic sensors.

It is an object of the invention to provide a rotation detection device in which a sensor unit is reduced in size and outputs of plural magnetic sensors provided inside the sensor unit are uniform.

According to an embodiment of the invention, a rotation detection device, comprises:
- a detection target member that is attached to a rotating member and comprising a plurality of magnetic poles along a circumferential direction about a rotational axis of the rotating member; and
- a sensor unit that is attached to a stationary member not rotating with rotation of the rotating member and is arranged to face the detection target member,
- wherein the sensor unit comprises a plurality of magnetic sensors and a housing portion covering the plurality of magnetic sensors together,
- wherein the magnetic sensors each comprise a plate-shaped detection portion comprising a magnetic detection element to detect a magnetic field from the detection target member and connection terminals extending out of the detection portion, and the magnetic sensors are arranged such that the detection portions are aligned in a plate thickness direction thereof,
- wherein the magnetic detection element is configured to detect a magnetic field in a direction perpendicular to the plate thickness direction, and
- wherein the sensor unit is positioned such that fore-end portions of the detection portions of the plurality of magnetic sensors face toward an axial end face of the detection target member, the fore-end portions being end portions located opposite to the side where the connection terminals extend out.

Advantageous Effects of Invention

According to an embodiment of the invention, it is possible to provide a rotation detection device in which a sensor unit is reduced in size and outputs of plural magnetic sensors provided inside the sensor unit are uniform.

BRIEF DESCRIPTION OF DRAWINGS

FIG. 3A is a schematic side view showing an internal structure of the sensor unit when viewed in a circumferential direction of a detection target member.

FIG. 3B is a schematic front view showing the internal structure of the sensor unit when viewed in a radial direction of the detection target member.

FIG. 4A is an explanatory plan view showing positions of magnetic sensors relative to the detection target member.

FIG. 4B is an explanatory side view showing the positions of the magnetic sensors relative to the detection target member.

FIG. 5 is a graph showing an example of magnetic flux density distribution across the cross section taken along the line A-A of FIG. 4A.

DESCRIPTION OF EMBODIMENTS

Embodiment

Figure 1:
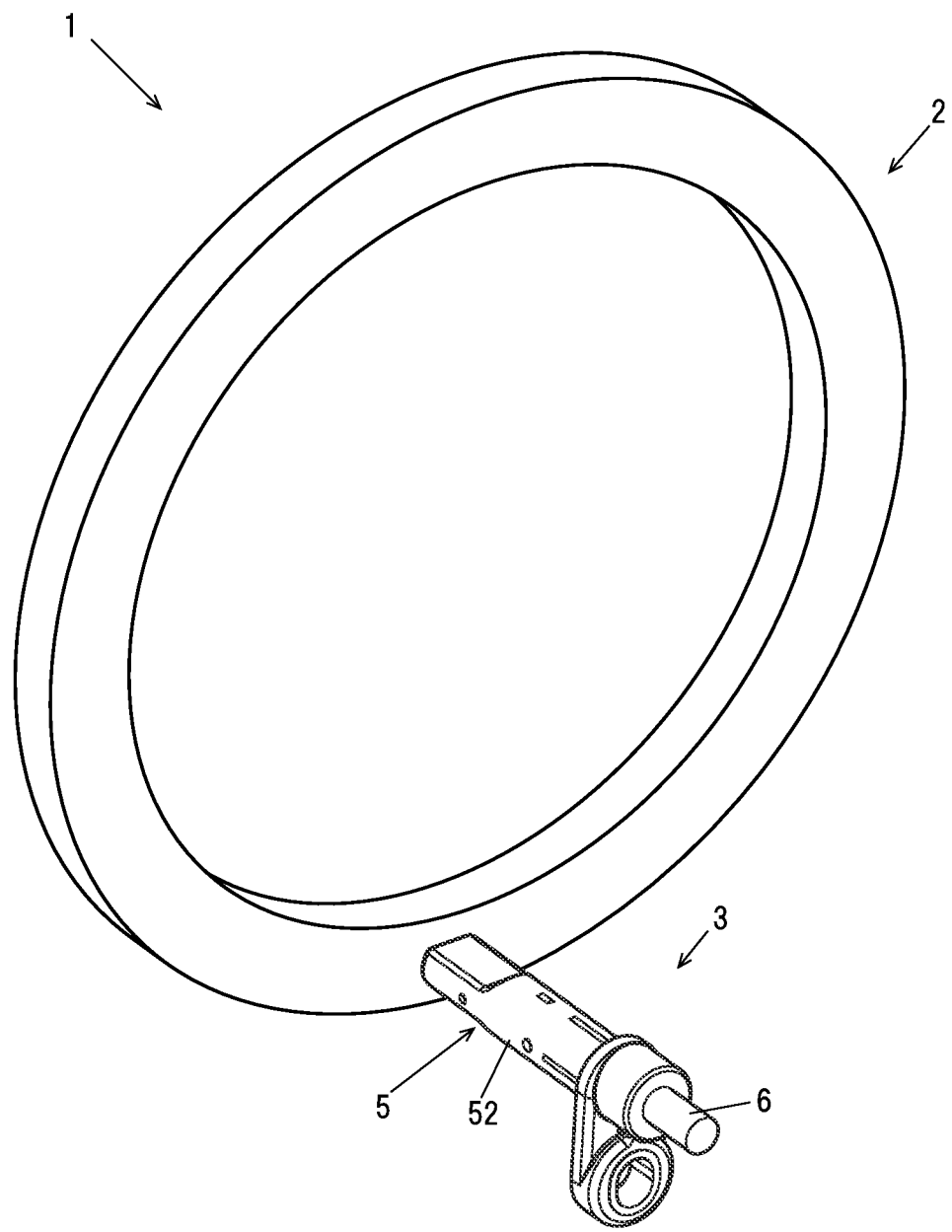
FIG. 1 is a schematic structural view showing a rotation detection device in an embodiment of the present invention.

An embodiment of the invention will be described below in conjunction with the appended drawings, FIG. 1 is a schematic structural view showing a rotation detection device in the present embodiment. As shown in FIG. 1, a rotation detection device 1 is provided with a detection target member 2 and a sensor unit 3. The rotation detection device 1 is used to detect, e.g., a rotational speed of a wheel of an automobile, i.e., a wheel speed.

(The Detection Target Member 2)

The detection target member 2 is attached to a rotating member (not shown) and rotates with the rotating member. When the rotation detection device 1 is used to detect a wheel speed, the rotating member is, e.g., an inner race that rotates with a wheel attached thereto. The detection target member 2 is formed in a shape of an annular plate perpendicular to a rotational axis of the rotating member and is attached to, e.g., an outer surface of the rotating member.

In the present embodiment, the detection target member 2 is constructed from a magnetic encoder having plural magnetic poles along a circumferential direction about the rotational axis of the rotating member. The detection target member 2 has N-poles and S-poles that are alternately arranged along the circumferential direction.

(The Sensor Unit 3)

Figure 2:
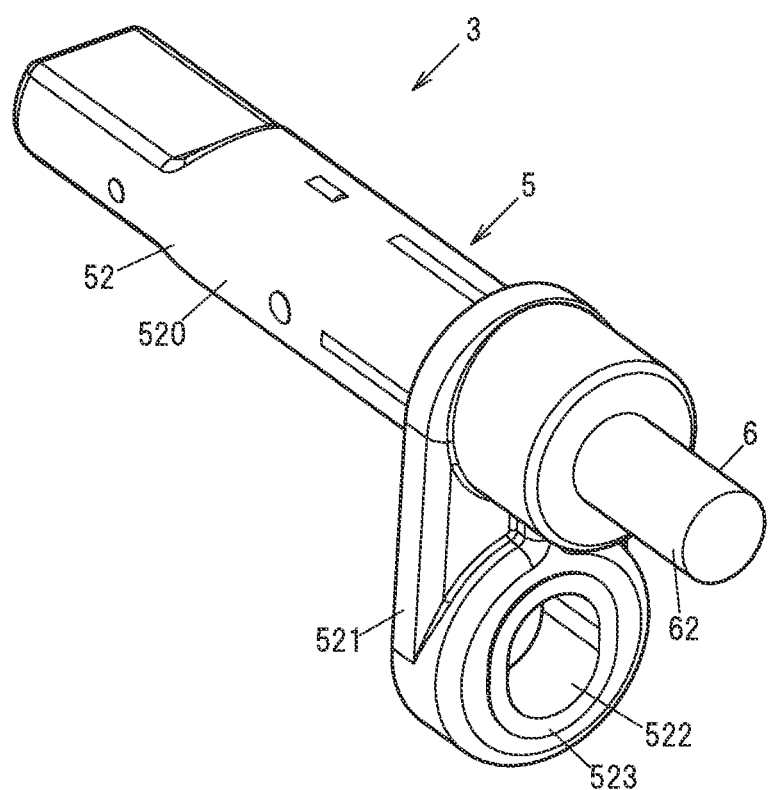
FIG. 2 is a perspective view showing an external appearance of a sensor unit.

FIG. 2 is a perspective view showing an external appearance of the sensor unit 3. FIGS. 3A and 3B are schematic diagrams illustrating an internal structure of the sensor unit 3, wherein FIG. 3A is a side view when viewed in the circumferential direction of the detection target member 2 and FIG. 3B is a front view when viewed in a radial direction of the detection target member 2.

As shown in FIGS. 1 to 3, the sensor unit 3 has plural magnetic sensors 4, and a housing portion 5 covering the plural magnetic sensors 4 together. Although the sensor unit 3 having two magnetic sensors 4 will be described here, the sensor unit 3 may have three or more magnetic sensors 4. The sensor unit 3 is provided at an end of a cable 6 and is attached to a stationary member that does not rotate with rotation of the rotating member. When the rotation detection device 1 is used to detect a wheel speed, the stationary member is, e.g., a steering knuckle that is connected to an automobile body and supports an outer race.

The sensor unit 3 is arranged so as to face the detection target member 2. In the present embodiment, the sensor unit 3 is positioned so that a fore-end portion, which is an end portion located opposite to the side where the cable 6 extends out, faces an axial end face of the detection target member 2. In more detail, the sensor unit 3 is positioned so that the fore-end portion thereof faces the axial end face of the detection target member 2 in an axial direction of the detection target member 2. The direction of the cable 6 extending from the sensor unit 3 is a direction parallel to the axial direction of the detection target member 2.

The cable 6 has two pairs of electric wires 61 corresponding to the two magnetic sensors 4. Each electric wire 61 has a center conductor 61a constructed from a stranded conductor formed by twisting highly conductive strands of copper, etc., and an insulation 61b formed of an insulating resin such as cross-linked polyethylene and covering the outer surface of the center conductor 61a. The cable 6 also has a sheath 62 covering the two pairs of electric wires 61 (four electric wires 61).

The two pairs of electric wires 61 are exposed from the sheath 62 at an end of the cable 6, and the center conductors 61a are further exposed from the insulations 61b at ends of the respective electric wires 61. A fore-end of the center conductor 61a exposed from the insulation 41b is electrically connected to a corresponding connection terminal 41 of the magnetic sensor 4 by welding.

(The Magnetic Sensor 4)

The magnetic sensor 4 has a plate-shaped detection portion 40 including magnetic detection elements (not shown) to detect a magnetic field from the detection target member 2, and a pair of connection terminals 41 extending out of the detection portion 40.

The magnetic detection element is constructed from an MR element (a magnetoresistive effect element) that detects a magnetic field in a direction perpendicular to the plate thickness direction of the detection portion 40, i.e., in a direction parallel to a surface of the detection portion 40. In the present embodiment, a GMR (Giant Magneto Resistive effect) element is used as the magnetic detection element. Alternatively, an AMR (Anisotropic Magneto Restive) element or a TMR (Tunneling Magneto Resistive) element can be also used as the magnetic detection element.

The detection portion 40 has the magnetic detection elements, a signal processing circuit (not shown) for processing signals output from the magnetic detection elements, and a resin mold 40a as a cover that covers the magnetic detection elements and the signal processing circuit together. The detection portion 40 is formed in a substantially rectangular plate shape (a rectangular shape in which one of four corners is chamfered) in a plan view.

The pair of connection terminals 41 extend from one long side of the detection portion 40 (a long side not connected to the chamfered corner) in a direction perpendicular to this long side, and the two connection terminals 41 are formed parallel to each other. In the present embodiment, the both connection terminals 41 are formed in a strip shape (a long plate shape) and tips thereof (ends on the opposite side to the detection portion 40) are electrically connected to the corresponding center conductors 61a of the electric wires 61.

A capacitative element to suppress noise is connected between the two connection terminals 41, and a capacitative element protecting portion 42 formed of a resin mold is provided to cover the capacitative element and a portion of the connection terminals 41 therearound. Hereinafter, an extending direction of the connection terminals 41 is referred to as a length direction of the detection portion 40, and a direction perpendicular to the length direction and the plate thickness direction is referred to as a width direction of the detection portion 40. In addition, an end portion of the detection portion 40 opposite to the side where the connection terminals 41 extend out (an end portion with a long side connected to the chamfered corner) is referred to as a fore-end portion.

In the present embodiment, the two magnetic sensors 4 are arranged so that the detection portions 40 are aligned in the plate thickness direction. In addition, the two magnetic sensors 4 are positioned so that the fore-end portions of the detection portions 40 face toward the fore-end portion side of the sensor unit 3. In addition, the detection portion 40 of each of the two magnetic sensors 4 has plural (two to three) magnetic detection elements aligned in the width direction.

In FIG. 3, detection positions to detect a magnetic field by the magnetic detection elements are denoted by the reference numeral 40b.

The sensor unit 3 of the rotation detection device 1 in the present embodiment is positioned so that the fore-end portions of the detection portions 40 of the both magnetic sensors 4 (the fore-end portion of the sensor unit 3) face toward the axial end face of the detection target member 2. In more detail, the sensor unit 3 is positioned so that the length direction of the detection portion 40 coincides with the axial direction of the detection target member 2 (so that the length direction of the detection portion 40 is perpendicular to the axial end face of the detection target member 2).

In this configuration, the detection portions 40 (the detection positions 40b of the magnetic field) of the two magnetic sensors 4 can have substantially the same distance from the detection target member 2 and it is also possible to closely arranged the two detection portions 40. As a result, it is possible to equalize outputs of the two magnetic sensors 4, thereby achieving uniform outputs.

In a general configuration of the conventional technique, the detection positions 40b of the magnetic field are arranged as close to the detection target member 2 as possible by positioning the detection portion 40 so that one surface faces the axial end face of the detection target member 2. However, detection accuracy of the magnetic sensor 4 has been greatly improved in recent years, and if the detection positions 40b of the magnetic field are too close to the detection target member 2, the magnetic sensor 4 cannot exhibit full performance in some cases. In the present embodiment, the detection positions 40b of the magnetic field can be located at some distance from the detection target member 2 and it is possible to allow the highly accurate magnetic sensor 4 to exhibit full performance, as compared to the conventional technique in which the portion 40 is positioned so that one surface faces the axial end face of the detection target member 2.

Furthermore, since it is not necessary to bend the connection terminals 41 in the present embodiment, it is easy to manufacture and it is possible to avoid a risk such as damage on the detection portion 40 by a bending process. In addition, since it is not necessary to bend the connection terminals 41, the entire sensor unit 3 can be reduced in size.

Meanwhile, e.g., aligning the two magnetic sensors 4 in the plate thickness direction so that the fore-end portions of the detection portions 40 are located opposite to each other is proposed in Patent Literature 1 described above. In this case, however, there is a problem that the two magnetic sensors 4 detect opposite rotation directions and calculation taking into account it needs to be done by a calculation device in a subsequent stage, hence, it is not preferable in view of versatility. In contrast, in the present embodiment, it is easy to make the two magnetic sensors 4 detect the same rotation direction by arranging the two magnetic sensors 4 with their front surfaces on the same side and the back surfaces on the other side, hence, high versatility.

In the meantime, the detection portion 40 in the present embodiment is configured to calculate a difference between detection values obtained by detecting a magnetic flux density at the both detection positions 40b and output a signal corresponding to the calculated difference through the connection terminals 41. Therefore, when the magnetic sensor 4 is arranged such that, e.g., the width direction of the detection portion 40 coincides with the radial direction of the detection target member 2, detection accuracy may decrease since changes in the magnetic field detected at the two detection positions 40b are substantially the same and the output difference is thus substantially zero.

Based on this, in the present embodiment, the sensor unit 3 is positioned so that the plate thickness direction of the detection portions 40 coincides with the radial direction of the detection target member 2, as shown in FIGS. 4A and 4B. In this configuration, the two magnetic sensors 4 are aligned in the radial direction of the detection target member 2. As a result, a phase of the detected magnetic field is different at the two detection positions 40b and the output difference increases, hence, detection accuracy is improved.

FIG. 5 shows an example of magnetic flux density distribution across the cross section taken along the line A-A of FIG. 4A. In this example, the magnetic flux density distribution across the cross section of the detection target member 2 taken along the radial direction is symmetric such that the magnetic flux density is highest at the radial center position of the detection target member 2 and decreases as the distance from the radial center position increases, as shown in FIG. 5. Therefore, in this case, by adjusting the position of the sensor unit 3 so that the detection positions 40b of the two magnetic sensors 4 are located at symmetric positions with respect to the radial center position of the detection target member 2, substantially the same outputs are obtained from the both magnetic sensors 4 and it is possible to achieve highly uniform outputs. In this regard, the magnetic flux density distribution in FIG. 5 is an example, and when, e.g., the magnetic flux density is highest at a position off the radial center position of the detection target member 2, the position of the sensor unit 3 is adjusted so that the detection positions 40b of the two magnetic sensors 4 are located at symmetric positions with respect to the position at which such a magnetic flux density is highest.

(The Housing Portion 5)

Figure 6:
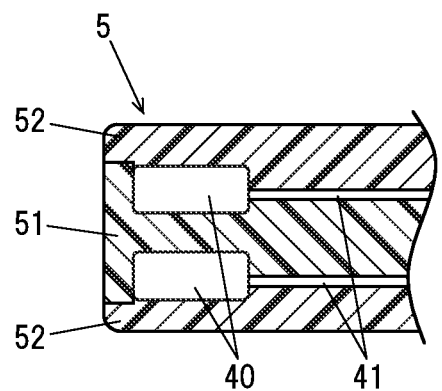
FIG. 6 is a cross sectional view showing an fore-end portion of the sensor unit.

As shown in FIG. 6, the housing portion 5 has a holder 51 holding the two magnetic sensors 4, and a resin mold portion 52 covering around the holder 51. The holder 51 is a member for protecting the magnetic sensors 4 and a connection portion between the magnetic sensors 4 and the cable 6 during molding the resin mold portion 52 and is formed beforehand by injection molding, etc. The resin mold portion 52 is formed by molding a resin in a state that the two magnetic sensors 4 and the cable 6 are set on the holder 51, thereby obtaining the housing portion 5.

In the present embodiment, the housing portion 5 is configured so that only the holder 51 constitutes a portion facing the fore-end portions of the detection portions 40. In other words, the housing portion 5 in the present embodiment is configured that the portion facing the fore-end portions of the detection portions 40 is not covered with the resin mold portion 52 and the holder 51 is exposed at a portion facing the detection target member 2 and directly faces the detection target member 2. Thus, a thickness of the housing portion 5 at the fore-end portion of the sensor unit 3 is provided by only one member (the holder 51) and the housing portion 5 can have a very small thickness at the fore-end portion of the sensor unit 3. This allows the magnetic field detection positions 40b of the detection portions 40 to be located closer to the detection target member 2 and it is thereby possible to suppress a decrease in detection accuracy due to too long distance between the magnetic field detection positions 40b and the detection target member 2.

As shown in FIG. 2, the resin mold portion 52 is configured that a main body 520, which covers the magnetic sensors 4, an end of the cable 6 and the holder 51 together, is integrally formed with a flange 521 for fixing the sensor unit 3 to the stationary member. A bolt hole 522 for inserting a bolt (not shown) used to fix the sensor unit 3 to the stationary member is formed on the flange 521, and a metal collar 523 for suppressing deformation of the flange 521 at the time of bolt fixation is provided along the inner circumferential surface of the bolt hole 522.

(Modification)

Although the both magnetic sensors 4 are arranged so that the detection portions 40 are perpendicular to the axial end face of the detection target member 2 in the embodiment described above, the detection portions 40 do not need to be exactly perpendicular to the axial end face of the detection target member 2 and some inclination is acceptable.

Figure 7:
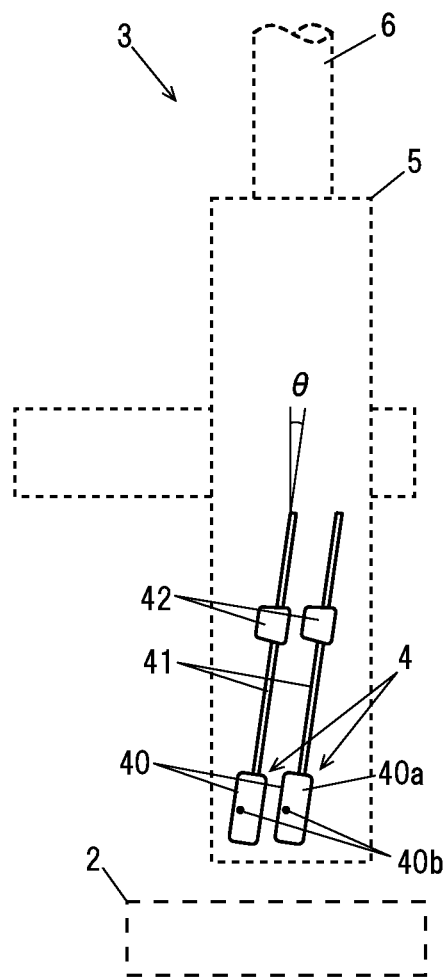
FIG. 7 is a side view showing an internal structure of the sensor unit in a modification of the invention.

In particular, an inclination θ of the length direction of the detection portions 40 relative to the axial direction of the detection target member 2 is not more than 30°, as shown in FIG. 7. It is because the inclination θ of more than 30° may lead to an increase in size of the sensor unit 3. Also the detection portions 40 of the two magnetic sensors 4 do not need to be exactly parallel to each other and some inclination is acceptable. However, since uniformity of outputs decreases with a decrease in parallelism between the two detection portions 40, a difference in the inclination θ between the two detection portions 40 is desirably not more than 18°.

Figure 8A:
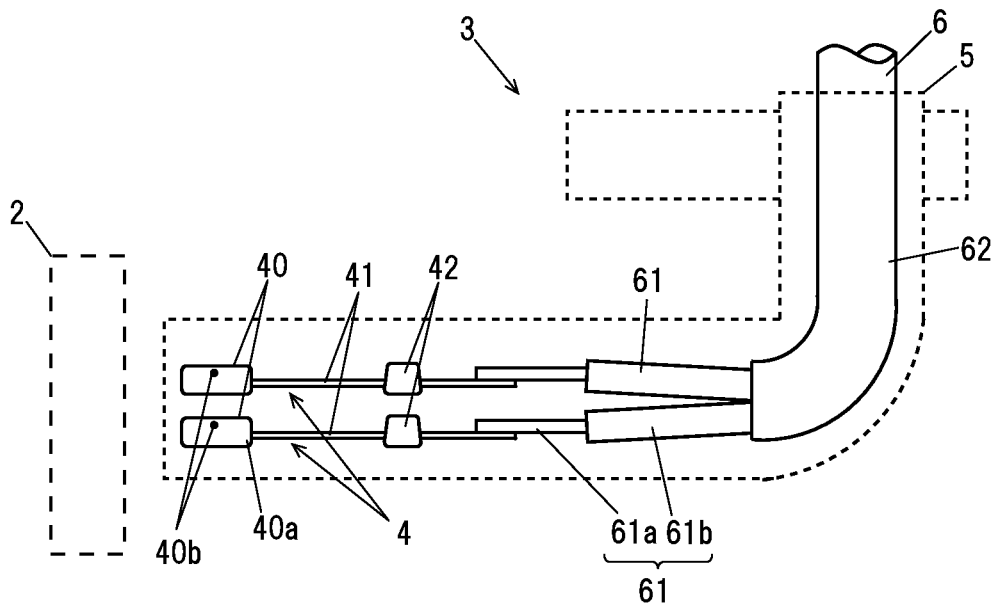
FIG. 8A is a side view showing an internal structure of the sensor unit in another modification of the invention.
Figure 8B:
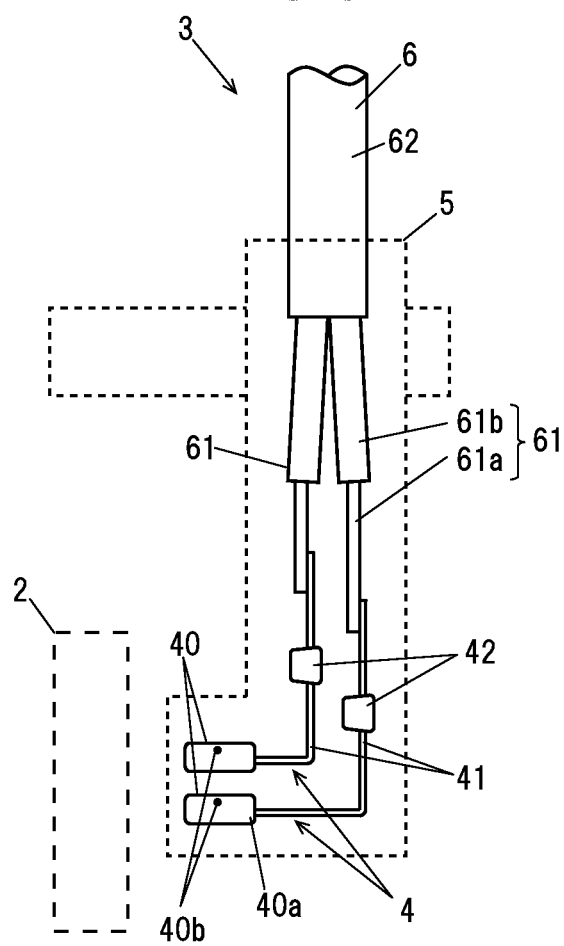
FIG. 8B is a side view showing an internal structure of the sensor unit in another modification of the invention.

In addition, although the example in which the length direction of the detection portions 40 coincides with the direction of the cable 6 extending from the sensor unit 3 has been described in the embodiment, the length direction of the detection portions 40 does not need to coincide with the extending direction of the cable 6. For example, the cable 6 may be bent inside the housing portion 5 as shown in FIG. 8A, or the connection terminals 41 may be bent inside the housing portion 5 as shown in FIG. 8B. Although the cable 6 or the connection terminals 41 are bent at 90° in FIGS. 8A and 8B, the bending angle can be appropriately changed.

In this case, an angle of the fore-end portion of the sensor unit 3 (a direction toward which the fore-end portions of the detection portions 40 face) relative to the extending direction of the cable 6 can be appropriately changed and the shape of the sensor unit 3 can be flexibly changed according to the shape of the stationary member on which the sensor unit 3 is mounted. However, in view of ease of manufacturing, it is preferable that the length direction of the detection portions 40 coincide with the direction of the cable 6 extending from the sensor unit 3.

Functions and Effects of the Embodiment

As described above, in the rotation detection device 1 of the embodiment, each magnetic detection element is configured to detect a magnetic field in a direction perpendicular to the plate thickness direction of the detection portion 40 and the sensor unit 3 is positioned so that the fore-end portions of the detection portions 40 of the both magnetic sensors 4 face toward the axial end face of the detection target member 2.

Thus, it is possible to easily obtain the same level of outputs from the two magnetic sensors 4, and it is possible to achieve uniform outputs. In addition, even when using highly accurate magnetic sensors 4, it is possible to prevent the magnetic field detection positions 40b from being located too close to the detection target member 2 and the magnetic sensors 4 thus can exhibit full performance. In addition, since the two magnetic sensors 4 are aligned in the plate thickness direction of the detection portion 40 in the present embodiment, it is possible to reduce the size of the sensor unit 3 as compared to when aligning the two magnetic sensors 4 in the width direction of the detection portion 40 as in the conventional technique.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A rotation detection device (1), comprising: a detection target member (2) that is attached to a rotating member and comprising a plurality of magnetic poles along a circumferential direction about a rotational axis of the rotating member; and a sensor unit (3) that is attached to a stationary member not rotating with rotation of the rotating member and is arranged to face the detection target member (2), wherein the sensor unit (3) comprises a plurality of magnetic sensors (4) and a housing portion (5) covering the plurality of magnetic sensors (4) together, the magnetic sensors (4) each comprising a plate-shaped detection portion (40) comprising a magnetic detection element to detect a magnetic field from the detection target member (2) and connection terminals (41) extending out of the detection portion (40), and the magnetic sensors (4) being arranged so that the detection portions (40) are aligned in a plate thickness direction of the detection portion (40), the magnetic detection element is configured to detect a magnetic field in a direction perpendicular to the plate thickness direction of the detection portion (40), and the sensor unit (3) is positioned so that fore-end portions of the detection portions (40) of the plurality of magnetic sensors (4) face toward an axial face of the detection target member (2), the fore-end portions being end portions located opposite to the side where the connection terminals (41) extend out.

[2] The rotation detection device (1) defined in [1], wherein the detection portion (40) comprises a plurality of the magnetic detection elements that are aligned in a width direction that is perpendicular to a length direction coinciding with an extending direction of the connection terminals (41) and also perpendicular to the plate thickness direction, and the sensor unit (3) is positioned so that the plate thickness direction of the detection portions (40) coincides with a radial direction of the detection target member (2).

[3] The rotation detection device (1) defined in [1] or [2], wherein the housing portion (5) comprises a holder (51) holding the plurality of magnetic sensors (4) and a resin mold portion (52) covering around the holder (51), and the housing portion (5) is configured such that a portion facing the fore-end portions of the detection portions (40) comprises only the holder (51).

[4] The rotation detection device (1) defined in any one of [1] to [3], wherein the sensor unit (3) comprises two of the magnetic sensors (4) that are arranged so that the detection portions (40) are aligned in the plate thickness direction of the detection portions (40).

Although the embodiment of the invention has been described, the invention according to claims is not to be limited to the embodiment described above. Further, please note that all combinations of the features described in the embodiment are not necessary to solve the problem of the invention. In addition, the invention can be appropriately modified and implemented without departing from the gist thereof.

REFERENCE SIGNS LIST

1 ROTATION DETECTION DEVICE
2 DETECTION TARGET MEMBER

3 SENSOR UNIT
4 MAGNETIC SENSOR
40 DETECTION PORTION
40a RESIN MOLD
40b POSITION WHERE MAGNETIC FIELD IS DETECTED
41 CONNECTION TERMINAL
42 CAPACITATIVE ELEMENT PROTECTING PORTION
5 HOUSING PORTION
51 HOLDER
52 RESIN MOLD PORTION
6 CABLE

The invention claimed is:

1. A rotation detection device, comprising:
a detection target member that is attached to a rotating member and comprising a plurality of magnetic poles along a circumferential direction about a rotational axis of the rotating member; and
a sensor unit that is attached to a stationary member not rotating with rotation of the rotating member and is arranged to face the detection target member,
wherein the sensor unit comprises a plurality of magnetic sensors and a housing portion covering the plurality of magnetic sensors together,
wherein the plurality of magnetic sensors each comprise a plate-shaped detection portion comprising a magnetic detection element to detect a magnetic field from the detection target member and connection terminals extending out of the plate-shaped detection portion along a length direction of the plate-shaped detection portion, and the plurality of magnetic sensors are arranged such that the plated-shaped detection portions are aligned in a plate thickness direction that is orthogonal to the length direction,
wherein the magnetic detection element is configured to detect a magnetic field in a direction perpendicular to the plate thickness direction, and
wherein the sensor unit is positioned such that fore-end portions along the length direction of the plate-shaped detection portions of the plurality of magnetic sensors are opposite to an axial end face of the detection target member, the fore-end portions being end portions located opposite to the side where the connection terminals extend out.

2. The rotation detection device according to claim 1, wherein the sensor unit is positioned such that the plate thickness direction coincides with a radial direction of the detection target member.

3. The rotation detection device according to claim 1, wherein the housing portion comprises a holder holding the plurality of magnetic sensors and a resin mold portion covering around the holder, and the housing portion is configured such that a portion facing the fore-end portions of the plated-shaped detection portions comprises only the holder.

4. The rotation detection device according to claim 1, wherein the sensor unit comprises two of the plurality of magnetic sensors that are arranged such that the plate-shaped detection portions are aligned in the plate thickness direction.

* * * * *